United States Patent Office

2,942,993
Patented June 28, 1960

2,942,993

METHOD OF ACCELERATING THE SETTING OF LIME-FLY ASH-SOIL MIXES

Richard L. Handy, 1322 Harding Ave., and Donald T. Davidson, 1416 Harding Ave., both of Ames, Iowa No Drawing. Filed Feb. 7, 1958, Ser. No. 713,795

8 Claims. (Cl. 106—118)

This invention relates particularly to a method of accelerating the setting of lime-fly ash-soil mixes. More generally, the invention is concerned with a method of processing of aggregate materials containing a substantial proportion of a pozzolan to form road bases and the like. The invention also has utility with lime-soil mixes which contain no fly ash or other aggregate material normally classified as a pozzolan.

Fly ash is an artificial pozzolan which is precipitated from the smoke of coal-burning electric power plants. For the most part, fly ash is a glass composed of silica and alumina with variable amounts of iron oxides. Approximately 25,000 tons of fly ash are now collected in the United States every day. With the change-over of power plants to the use of powdered coal, the quantity of available fly ash has greatly outstripped possible uses, and is therefore mainly a waste product which is disposed of by dumping rather than being put to any beneficial use.

A small part of the fly ash now being produced in the United States is used in conjunction with lime for the stabilization of soil. Moistened mixtures of soil, lime and fly ash can be compacted into a slowly hardening subbase or base course for a road, airfield, parking lot, or similar use. The lime and fly ash react pozzolanically. Immediately after compaction according to the usual practice, the base course for the road or other surface is covered with a bituminous surface to prevent traffic abrasion and drying out. The finished surface, however, cannot be opened to use until the base course has hardened or set to provide sufficient compressive strength. This will require up to several weeks or several months, depending on soil type, temperature conditions, and other climatic variables.

In order that paved surfaces having lime-fly ash-soil bases can be opened to use with reduced waiting periods, it would be extremely desirable to find a method of accelerating the setting of the lime-fly ash-soil mixes. This need is particularly acute during the fall and winter months. Temperatures near and below freezing tend to interrupt and prolong the setting process. Lime-fly ash-soil mixes are therefore not commonly laid down after the early part of the fall, which means that paved surfaces of this type can only be constructed on a practical basis during the spring and summer months. Even during these more favorable months, as already indicated, it would be extremely desirable to reduce the waiting periods so that the roads and the like may be opened to traffic or other use with a minimum of delay.

It is therefore a general object of this invention to provide a method of accelerating the setting of lime-fly ash-soil mixes. Further objects and advantages will appear as the specification proceeds.

This invention is based in part on the discovery that water-soluble carbonates like sodium carbonate markedly accelerate the setting or hardening of lime-fly ash-soil mixes. While sodium carbonate is preferred, other water-soluble carbonates can be substituted such as potassium carbonate. Carbonate is preferably added to the mix as a dry powder rather than as an aqueous solution, although some of the advantages of the present invention can be obtained by either method of addition. The use of the carbonate in the form of a dry powder avoids a flash set and tends to produce maximum early strengths.

While this invention will probably find its greatest application in the stabilization of soil, it is applicable generally to the processing of aggregate materials containing at least 5% of fly ash or other pozzolan to form road bases and the like. The aggregate material can be any fine aggregates which have heretofore been known as suitable for combining with lime and fly ash or other pozzolan. The major proportion of the mix will be aggregate material with the lime and carbonate accelerator as minor ingredients. For example, the aggregate may be composed of from 10–40% by weight of fly ash or other pozzolan, and from 90–60% by weight of a non-glassy and non-pozzolanic aggregate material. Soil alone may be used in place of a non-natural mixture glassy and non-glassy aggregate materials. Apparently, soil contains components which react pozzolanically with lime and therefore the setting reaction can be accelerated by the method of this invention.

In practicing the method of this invention, it is preferred to incorporate in the mix prior to compaction from .1 to 5% by weight of the carbonate accelerator. As indicated previously, the carbonate can be combined with the mix in any suitable manner, but it is preferably added thereto in the form of a substantially dry powder. Best results appear to be obtained when the mix contains from .3 to 2% by weight of the carbonate accelerator. For some purposes, the accelerator may be added in a solution or as a brine containing the carbonate as a principal ingredient.

The amount of lime employed can vary considerably. For example, from 1 to 10 parts of lime and from .1 to 5 parts of the carbonate accelerator can be used per each 100 parts by weight of the aggregate materials. Preferably, the aggregate materials should include at least as much fly ash or other pozzolan as the amount of lime employed. Normally, the aggregate materials will include at least 5–10% by weight of the pozzolan. In some cases, as much as 60–70% of the fly ash or other pozzolan can be used. The preferred formulation would cover aggregate materials containing 10–40% of fly ash, and from 90–60% of a non-glassy aggregate which would be combined with from 2 to 6 parts of lime and from .3 to 2 parts of sodium or potassium carbonate per 100 parts of aggregate.

The term "lime" as used in this application is intended to be generic as covering all commercial and byproduct limes which are reactable with pozzolans. This would include quicklime consisting of either calcium oxide or a mixture of calcium and magnesium oxides, or hydrated lime containing the equivalent hydroxides and remnant oxides.

It should also be understood that the term "soil," unless otherwise indicated, is used generically as covering natural, ungraded aggregates ranging from gravels to sands to clays. If desired, these natural aggregate materials can be combined with any other available aggregate materials such as crushed stone, cinders, slags, etc. Some soils, as indicated previously, contain components which react pozzolanically with lime.

In preparing mixes in accordance with this invention, sufficient moisture (water) should be present to provide for proper placement or compaction. This will vary with the character of the soil or other aggregate material, sandy soils, for example, requiring less water and clayey soils requiring more water. For some purposes, the mix prior to setting may be in the form of a slurry.

This invention is further illustrated by the following specific examples.

EXAMPLE 1

A series of samples was prepared from sand, fly ash and lime. One part of the lime (calcium hydroxide) is mixed with each 9 parts of the fly ash. A moistened, compactable mixture was then prepared from 3 parts of sand to 1 part of the lime-fly ash mixture. One portion of this mix was used as a control with no accelerator being added. Four other portions were mixed with two different accelerators at two different concentrations, the amount of accelerator being expressed on the basis of combined dry weight of the lime-fly ash-soil. Individual samples were compacted to Proctor Density specifications with optimum water for compaction. The specimens were wrapped and moist-cured at 70° F. The test data are summarized below in Table A.

Table A

| Accelerator | 7-day strength, p.s.i. | | 28-day strength, p.s.i. | |
|---|---|---|---|---|
| | 0.5% | 1.0% | 0.5% | 1.0% |
| None | (9) | | (34) | |
| $Na_2CO_3$ | 400 | 378 | 743 | 606 |
| $K_2CO_3$ | 324 | | 695 | |

EXAMPLE 2

Further test samples were prepared as described in Example 1 except that the lime-fly ash mixture which was combined with the sand contained 2 parts of lime to 8 parts of fly ash. Otherwise, the proportions, the accelerator concentrations, and the procedure were the same as described in Example 1. The results are summarized below in Table B.

Table B

| Accelerator | 7-day strength, p.s.i. | | 28-day strength, p.s.i. | |
|---|---|---|---|---|
| | 0.5% | 1.0% | 0.5% | 1.0% |
| None | (7) | | (66) | |
| $Na_2CO_3$ | 435 | 514 | 994 | 997 |

EXAMPLE 3

Following the procedure of the foregoing examples, a natural silty soil was substituted for the sand. The results are summarized below in Table C.

Table C

| Accelerator | 14-day immersed strength, p.s.i. | 28-day immerse, strength p.s.i. |
|---|---|---|
| None | 79 | 109 |
| $Na_2CO_3$ | 103 | 215 |

EXAMPLE 4

The immersed compressive strengths of lime-fly ash slurries was determined with no accelerator as a control, 2% sodium carbonate, and 4% sodium carbonate, expressed on the basis of the combined dry weight of the lime-fly ash. Fly ash and lime (calcium hydroxide) were combined in the ratio of 15 parts lime per 85 parts fly ash. 50% water was added on the basis of the combined lime and fly ash. The specimens were wrapped and cured at 70° F. or 140° F. The results are summarized below in Table D.

Table D

| Accelerator | 12-hour strength, p.s.i. | | 24-hour strength, p.s.i. | |
|---|---|---|---|---|
| | 70° F. | 140° F. | 70° F. | 140° F. |
| None | 0 | 20 | 0 | 33 |
| 2% $Na_2CO_3$ | 9 | 201 | 15 | 290 |
| 4% $Na_2CO_3$ | | | 24 | 220 |

EXAMPLE 5

The effectiveness of adding the accelerator in a solution as compared with a powder was evaluated. The samples were prepared as described in Example 1. The concentration of the accelerator in all of the sample was 0.5% on the basis of the combined weight of the sand, lime, and fly ash. In some of the samples, the accelerator was mixed with the other ingredients as a dry powder, and in others as a concentrated solution. The results are summarized below in Table E.

Table E

| Accelerator | 7-day immersed strength, p.s.i. | 28-day immersed strength, p.s.i. |
|---|---|---|
| None | 9 | 34 |
| $Na_2CO_3$, powder | 400 | 743 |
| $Na_2CO_3$, dissolved | 234 | |
| $K_2CO_3$, powder | 324 | 695 |
| $K_2CO_3$, dissolved | 180 | |

In the foregoing specification and the examples, the use of water-soluble carbonates, particularly sodium and potassium carbonate, has been illustrated. On the basis of the experimental work leading to the present invention, these are deemed to be the best and cheapest accelerators for the purposes herein described. No other accelerators are known which are the full equivalent of sodium or potassium carbonate. However, we have discovered that the water-soluble permanganates, such as potassium and sodium permanganate, can be substituted for the carbonates while achieving some of the benefits associated with the use of carbonates. This finding is very difficult to explain, since there would be no reason for assuming, for example, that potassium permanganate would have an accelerating action on lime-fly ash-soil mixes. If it is desired to employ the permanganates, such as potassium permanganate, the procedure would be substantially as previously described for the carbonate. From the standpoint of both cost and performance, however, it is believed that the carbonates are distinctly preferable to the permanganates.

While in the foregoing specification this invention has been described in considerable detail and various examples thereof have been given, it will be apparent to those skilled in the art that the invention is susceptible to other embodiments than those specifically described herein, and that many of the details can be varied without departing from the basic principles of the invention.

We claim:

1. In the method of stabilizing soil and aggregate materials by mixing a lime and a pozzolan therewith in the presence of moisture and compacting the resulting mixture said mixture containing from 1 to 10 parts by weight of said lime, the improvement consisting of incorporating in said mixture prior to said compaction at least .1% and not substantially over 2% by weight of a water-soluble carbonate selected from the group consisting of the sodium and potassium carbonates.

2. The method improvement of claim 1 in which said carbonate is sodium carbonate.

3. The method improvement of claim 1 characterized by the further fact that said carbonate is incorporated in the form of a substantially dry powder.

4. In the method of stabilizing soil and aggregate materials containing a substantial amount of a pozzolan by mixing a lime and a fly ash therewith in the presence of moisture and compacting the resulting mixture, said mixture containing from 1 to 10 parts by weight of said lime, the improvement consisting of incorporating in said mixture prior to said compaction from .3 to 2% by weight of sodium carbonate.

5. The method improvement of claim 4 characterized by the further fact that said sodium carbonate is incorporated in the form of a substantially dry powder.

6. In the processing of aggregate materials containing at least 5% of a pozzolan to form road bases and the like, the steps consisting of adding to said aggregate materials from 1 to 10 parts of lime and from .3 to 2 parts of a carbonate per each 100 parts by weight of said aggregate materials, said carbonate being selected from the group consisting of the sodium and potassium carbonates, mixing the lime, carbonate and aggregate materials together in the presence of water to form a compactable mix, and thereafter compacting portions of said mix.

7. The process steps of claim 6 wherein said carbonate is added to said aggregate material in the form of a substantially dry powder.

8. In the processing of aggregate materials containing from 10 to 40% of fly ash and from 90 to 60% of a non-glassy aggregate to form road bases and the like, the steps consisting of adding to said aggregate materials from 2 to 5 parts of lime and from .3 to 2 parts of sodium carbonate per each 100 parts by weight of said aggregate materials, said sodium carbonate being added in the form of a substantially dry powder, mixing the lime, sodium carbonate and aggregate materials together, adding sufficient moisture to form a compactable mix, and thereafter compacting portions of said mix.

References Cited in the file of this patent

UNITED STATES PATENTS

| | | |
|---|---|---|
| 1,604,575 | Holmes et al. | Oct. 26, 1926 |
| 2,423,335 | Minnick | July 1, 1947 |
| 2,815,294 | Hauelin et al. | Dec. 3, 1957 |